United States Patent Office 2,781,861
Patented Feb. 19, 1957

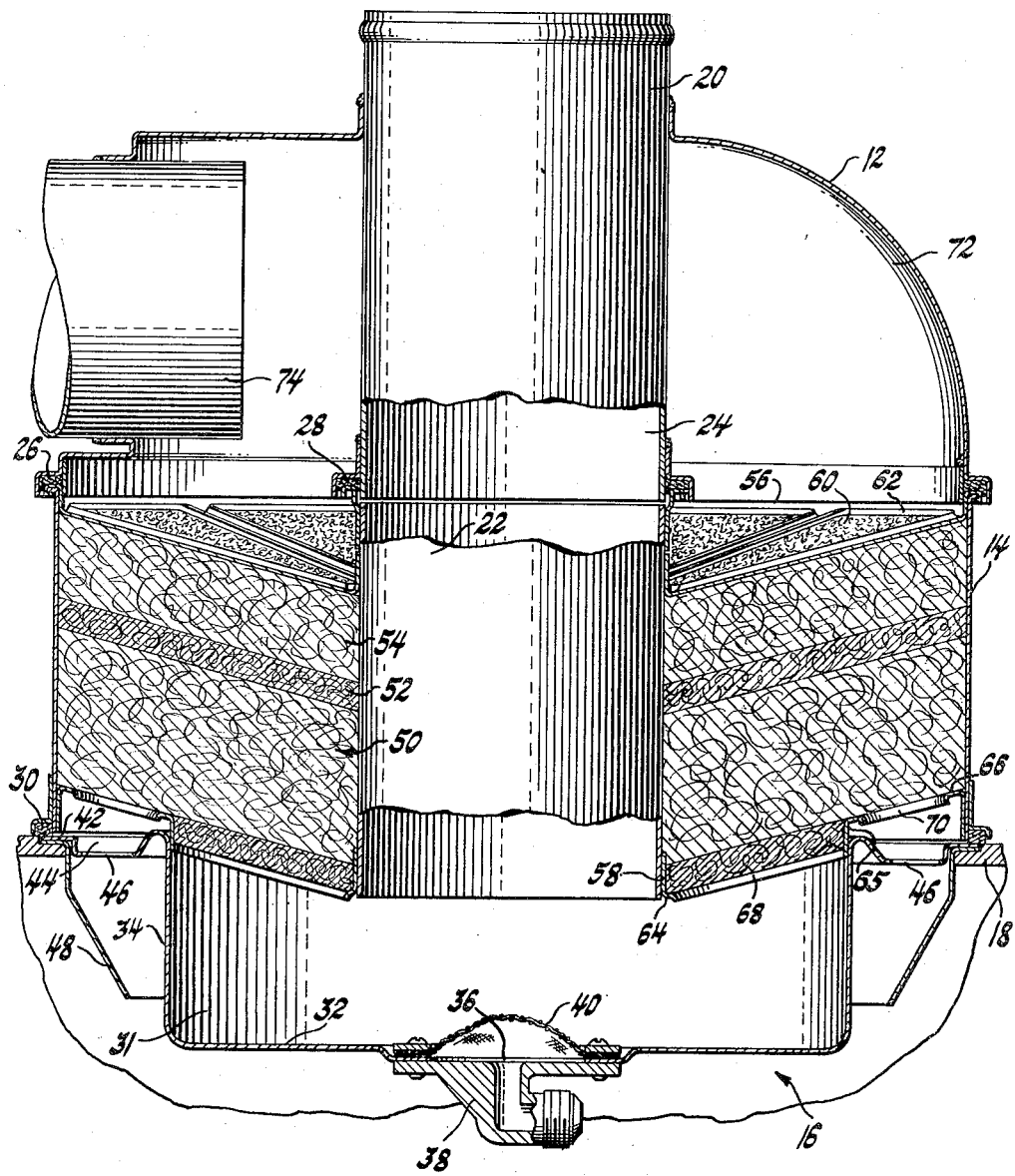

2,781,861

AIR CLEANER

Donald B. Lewis, Lapeer, Mich., assignor to General Motors Corporation, Detroit, Mich., a corporation of Delaware Application February 3, 1954, Serial No. 407,910

1 Claim. (Cl. 183—15)

This invention relates to air cleaners generally and in particular to forced feed liquid bath air cleaners for use with heavy duty farm, military and other equipment.

Heavy duty air induction equipment such as that used with farm machinery, earth moving apparatus, and military vehicles are continually required to clean dust ladened and otherwise contaminated air. The air cleaning devices used in the past by such equipment have been at most acceptable for only limited periods of time beyond which they have become clogged and otherwise ineffective requiring disassembly, inspection, and repair. Constant surveillance of such devices is most impractical and consequently a more self-sustaining air filtering device is much in demand.

It is now proposed to provide an air cleaner which requires a minimum of attention or maintenance in that it is essentially a self-cleaning device capable of continued operation for long periods without fear of clogging or of carrying over foreign matter with the inducted air, is easily assembled and disassembled for servicing, includes a minimum of separable units, is sturdy, compact and highly effective.

The proposed air cleaner is a forced feed liquid bath air cleaner having liquid introduced under pressure at a predetermined rate of flow from a reservoir or other source and which liquid is uniformly spread over a baffle imposed directly within the path of inducted air. The impure air is diverted by the liquid covered baffle centrally into a filter housing, carrying over sufficient liquid to wet the filter material disposed therein. The filter housing is formed as a removable cartridge for greater ease in servicing and is adapted to cooperate with other elements of the air cleaner to form the air induction passage. Filter retainer members are provided at opposite ends of the cartridge for holding alternate layers of dense and loosely packed filter material therebetween. The retainer members are adapted to arrange the filter material layers in a manner assisting the separation out of excess liquid and foreign matter trapped therein. The retainer adjacent the baffle member further cooperates in the formation in a low pressure area about the outer periphery of the filter housing. The excess liquid passed to the lower pressure areas is gravitationally drained off through openings provided in the lower retainer member to the liquid reservoir from whence the liquid originally came. The gravitationally drained liquid is also adapted to wash away the foreign matter entrained in the fibers of the filter material.

In the drawing is shown a side elevational view of an air cleaner embodying the features of this invention.

The forced feed oil bath air cleaner shown in the drawing includes a dome shaped cover member 12, a filter housing or cartridge member 14, and a baffle member 16 which members are removably secured together and mounted upon a supporting member 18. The supporting member 18 may well be the cover of a liquid reservoir. An air inlet conduit 20 is formed centrally through the cover member 12 and is aligned with a similar conduit 22 formed through the filter housing 14. The conduits 20 and 22 form an air flow passage 24 through the air cleaner terminating within the bow shaped baffle 16. In order to assure an air tight seal between the adjacently engaged members forming the air cleaner the edges of the cover member 12, conduit 20 and filter housing 14 are adapted to retain gaskets or seals 26, 28 and 30 respectively.

The baffle 16 is formed to provide a chamber 31 having a bottom wall 32 and annular side wall 34. An opening 36 is formed through the bottom wall 32 and a fitting 38 is secured thereover. Liquid under pressure is adapted to be conveyed through the fitting 38 to the baffle 16. A diffusing screen 40 is secured over the opening 36 within the baffle 16. In the present instance the opening 36 for the access of liquid to the baffle is disposed centrally beneath the air flow passage 24 and is provided with screen 40 in order to assure a more uniform distribution of liquid over the baffle directly in the path of the inducted air. An annular ledge 42 is formed about the open end of the baffle 16. A trough 44 is formed within the ledge 42 and drain openings 46 are formed through the trough. A splash shield 48 is secured to the outer edge of the ledge 42 and extends downwardly and is inclined inwardly adjacent the side wall 34 of the baffle 16.

The filter housing or cartridge member 14 seats upon the annular ledge 42 of the baffle 16 with the central portion thereof, including the conduit 22, disposed over the chamber 31 of the baffle. The gasket 30 assists in maintaining the proper centered relationship. The housing 14 is filled with filtering material 50 disposed in alternate conical parallel layers of fine and dense filter material 52 and more coarse and loosely packed material 54. Retainer members 56 and 58 are secured across opposite ends of the filter housing 14 to hold the filter material within the housing. The upper retainer 56 is provided with sectoral openings 60 and may have the edges of the retainer forming the openings turned over as at 62 to strengthen the retainer member. The lower retainer member 58 is formed to provide two annular sections 64 and 66 disposed in different parallel conical planes and a vertical annular wall 65. The annular side wall 34 of the baffle 16 fits over the vertical annular wall 65 of the retainer 58 to position the annular section 64 within the top of the chamber 31. Openings 68 and 70 are formed through the annular sections 64 and 66 respectively of the retainer member 58. Both of the retainer members 56 and 58 extend outwardly and are inclined upwardly with respect to the conduit 22 and consequently cause the layers 52 and 54 of filtering material to be similarly disposed in an upwardly inclined position.

The dome shaped cover member 12 includes an air collecting chamber 72 wherein filtered air is collected. The filtered air flows around the conduit 20 formed through the cover member 12 and is discharged through conduit 74.

In operation, the cover member 12, filter housing 14 and baffle member 16 are removably secured together by any conventional means. Liquid is then admitted through the fitting 38 and diffusing screen 40 to the baffle 16 at a predetermined rate of flow. The diffusing screen 40 is adapted to cause the liquid to be distributed evenly in all directions over the baffling surface to provide uniform wetting around the baffle interior. The flow of liquid is continuous and is independent of the flow of inducted air.

Dust laden or otherwise impure air is inducted through passage 24 to within the chamber 31 of the baffle 16. The air is abruptly diverted by the baffle causing some of the impurities to be entrapped in the liquid. The force of the air over the liquid covered baffle 16 carries over liquid from the chamber 31 through the openings 68 in the retainer 64 and into the filter housing 14. The first layer of filter material encountered is fine and dense causing a thorough mixing of air and liquid. The air and liquid enter the first filter layer at a relatively high velocity which causes the filter material to be well wetted and a great deal of dirt to be caught on the wet fibers thereof. As the air-liquid mixture enters the second layer of filter material, which is more coarse and loosely packed, it expands greatly and allows the liquid to separate out by impingement against the filter fibers and by gravity; the air velocity no longer being sufficient to support the liquid particles. In order to assist the separation out of liquid the alternate layers of filter material 52 and 54 are upwardly inclined towards the periphery of the filter housing 14. The retainer 64 admits air to only the central annular portion of the filter housing and provides an isolated low pressure area about the periphery of the filter housing which is beyond the air flow stream. The liquid falls from the second layer through the low pressure area and drains through openings 70, over the splash shield 48, and back into the reservoir or a collecting chamber connected to a reservoir. All foreign matter entrapped in the filter fibers are washed ahead of the excess liquid and likewise carried through openings 70 to the reservoir or settling area. The function of the other layers of filtering material is to spread out the air flow to provide a more uniform velocity and to capture any liquid not already removed by previous filter material layers. The air then enters the collecting chamber 72 and passes through conduit 74.

The procedure does not vary regardless of air flow rates. However at low flow rates the air velocity may be insufficient to carry over liquid as rapidly as it is supplied. This will cause the liquid level to rise until the excess liquid in the chamber 31 spills over the central annular wall 65 of the retainer member 64 to drain back through opening 70 into the reservoir. Much of the lower layer of filter material will be directly wetted by the rising liquid level at very low air flow rates but the inducted air will not be cut off thereby.

I claim:

Air cleaner means which includes separate filter housing, cover and liquid sump members secured together and having separate air inlet passage means cooperatively disposed and formed within and through said cover and housing members and in open communication with said liquid sump member, air filtering means disposed within said housing and including a plurality of alternate layers of adjacently disposed filter materials of different densities, air outlet passage means formed through said housing and cover members and in open communication with said liquid sump, said sump as secured to said housing having the outer wall thereof disposed inside the space defined by the outer wall of said housing for limiting said outlet passage means through said housing to within the inner periphery thereof, said filter materials within said housing being inclined upwardly and outwardly in the direction of the flow of air therethrough for directing liquids entrained in said air towards the outer periphery of said housing, and drain passage means formed within the outer periphery of said housing and outside of said sump for exhausting liquids carried over from said sump into said filter materials and directed by said filter materials into said drain passage means away from said air cleaner means.

References Cited in the file of this patent
UNITED STATES PATENTS

| | | |
|---|---|---|
| 1,851,427 | Hinkle | Mar. 29, 1932 |
| 2,000,706 | Lowther | May 7, 1935 |
| 2,006,927 | Lowther | July 2, 1935 |
| 2,083,649 | Heglar | June 15, 1937 |
| 2,159,551 | Darnell | May 23, 1939 |
| 2,280,417 | Lundberg et al. | Apr. 21, 1942 |
| 2,622,695 | Deffenbaugh | Dec. 23, 1952 |
| 2,627,935 | Beach | Feb. 10, 1953 |
| 2,660,261 | Jeffrey | Nov. 23, 1953 |